(12) United States Patent
Penca et al.

(10) Patent No.: US 12,442,460 B2
(45) Date of Patent: Oct. 14, 2025

(54) COUPLING DEVICE, VALVE SYSTEM AND METHOD FOR ASSEMBLING A COUPLING DEVICE

(71) Applicant: Akrapovic d.d., Ivancna Gorica (SI)

(72) Inventors: Jure Penca, Ljubljana (SI); Henrik Zaletelj, Dobrnic (SI); Boštjan Veber, Polzela (SI)

(73) Assignee: Akrapovic d.d., Ivancna Gorica (SI)

( * ) Notice: Subject to any disclaimer, the term of this patent is extended or adjusted under 35 U.S.C. 154(b) by 0 days.

(21) Appl. No.: 18/255,699

(22) PCT Filed: Dec. 1, 2021

(86) PCT No.: PCT/EP2021/083796
§ 371 (c)(1),
(2) Date: Jun. 2, 2023

(87) PCT Pub. No.: WO2022/117659
PCT Pub. Date: Jun. 9, 2022

(65) Prior Publication Data
US 2024/0376991 A1    Nov. 14, 2024

(30) Foreign Application Priority Data
Dec. 2, 2020   (EP) .................................... 20211319

(51) Int. Cl.
*F16K 27/00*   (2006.01)
*F16D 3/06*    (2006.01)
(Continued)

(52) U.S. Cl.
CPC ................. *F16K 27/00* (2013.01); *F16D 3/06* (2013.01); *F01N 1/163* (2013.01); *F01N 1/18* (2013.01);
(Continued)

(58) Field of Classification Search
CPC . F16K 27/00; F16K 1/221; F16D 3/06; F16D 3/04; F16D 3/28; F16D 3/66;
(Continued)

(56) References Cited

U.S. PATENT DOCUMENTS 1,950,448 A  *  3/1934  Heisterkamp ............. F16D 3/72
                                                       464/57
1,977,806 A  * 10/1934  Richardson ............. F16K 27/00
                                                       137/512
(Continued)

FOREIGN PATENT DOCUMENTS

CN       209195565 U    8/2019
DE    102015202211 A1   8/2016
(Continued)

OTHER PUBLICATIONS

Feb. 2, 2022—(PCT) International Search Report and Written Opinion—App. PCT/EP2021/083796.
(Continued)

*Primary Examiner* — Minh Q Le
(74) *Attorney, Agent, or Firm* — Banner & Witcoff Ltd.

(57) ABSTRACT

A Coupling device may be used to connect a drive shaft of an actuator to a driven shaft of an exhaust-gas valve. The coupling device may define a rotational axis and include a torsionally rigid retainer having an axially extending slot, a coupling rod received in the slot for translational movement relative to the retainer in the direction of the rotational axis, (Continued)

and an elastic element biasing the coupling rod in the direction of the rotational axis and having an attachment section fixed to the retainer. The retainer and the coupling rod may be non-rotatably connected.

16 Claims, 4 Drawing Sheets

(51) Int. Cl.
| | |
|---|---|
| *F01N 1/16* | (2006.01) |
| *F01N 1/18* | (2006.01) |
| *F01N 13/18* | (2010.01) |
| *F02D 9/04* | (2006.01) |
| *F02D 9/10* | (2006.01) |
| *F16D 3/04* | (2006.01) |
| *F16D 3/10* | (2006.01) |
| *F16D 3/28* | (2006.01) |
| *F16D 3/52* | (2006.01) |
| *F16D 3/66* | (2006.01) |
| *F16D 3/77* | (2006.01) |
| *F16K 1/22* | (2006.01) |

(52) U.S. Cl.
CPC .......... *F01N 13/18* (2013.01); *F01N 2240/36* (2013.01); *F02D 9/04* (2013.01); *F02D 9/1065* (2013.01); *F16D 3/04* (2013.01); *F16D 3/10* (2013.01); *F16D 3/28* (2013.01); *F16D 3/52* (2013.01); *F16D 3/66* (2013.01); *F16D 3/77* (2013.01); *F16D 2250/0084* (2013.01); *F16D 2300/12* (2013.01); *F16K 1/221* (2013.01)

(58) Field of Classification Search
CPC ............... F16D 3/77; F16D 2250/0084; F16D 2300/12; F16D 3/10; F16D 3/52; F01N 2240/36; F01N 1/163; F01N 1/18; F01N 13/18; F02D 9/1065; F02D 9/04; F02D 3/52
USPC ..................................... 137/315.01
See application file for complete search history.

(56) References Cited

U.S. PATENT DOCUMENTS

| | | | | |
|---|---|---|---|---|
| 5,996,551 | A * | 12/1999 | Schroder .................. | F02D 9/02 |
| | | | | 251/336 |
| 7,374,147 | B2 * | 5/2008 | Nohl ..................... | F16K 31/563 |
| | | | | 251/294 |
| 9,624,837 | B2 * | 4/2017 | Abram ...................... | F01N 1/16 |
| 10,711,706 | B2 * | 7/2020 | Aigner .................. | F16K 31/045 |
| 11,408,529 | B2 * | 8/2022 | Schmitt .................... | F02M 26/70 |
| 11,448,142 | B2 * | 9/2022 | Ishii ....................... | F02D 9/1085 |
| 2009/0293654 | A1 | 12/2009 | Pintauro | |
| 2017/0138274 | A1 | 5/2017 | Stark et al. | |
| 2017/0284310 | A1 * | 10/2017 | Delplanque ............. | F16K 1/221 |
| 2018/0238209 | A1 * | 8/2018 | Suzuki .................... | F01N 13/18 |
| 2019/0170092 | A1 | 6/2019 | Oblinger et al. | |
| 2019/0237957 | A1 | 8/2019 | Kiely et al. | |
| 2020/0095945 | A1 * | 3/2020 | Zeumer ...................... | F16D 3/06 |
| 2020/0095946 | A1 * | 3/2020 | Zeumer ...................... | F16D 3/06 |
| 2021/0246841 | A1 * | 8/2021 | Edler .................... | F02D 9/1065 |
| 2022/0228533 | A1 * | 7/2022 | Grun ..................... | F16K 31/043 |

FOREIGN PATENT DOCUMENTS

| | | |
|---|---|---|
| DE | 102018112423 A1 | 11/2019 |
| DE | 102019120959 A1 | 2/2020 |
| FR | 30 84 709 A1 | 2/2020 |
| JP | S54156043 U | 10/1979 |
| JP | 2011 205 780 A | 10/2011 |
| WO | 2019 224 792 A1 | 11/2019 |

OTHER PUBLICATIONS

Dec. 13, 2024 (KR) Office Action—App. 10-2023-7022447.
Nov. 15, 2024 (JP) Office Action—App. 2023-533734.
Jun. 26, 2025—Chinese (CN) Office Action—App. 202180089170.X.
Jun. 2, 2025—Saudi Arabian (SA) Office Action—App. 523441024.

* cited by examiner

COUPLING DEVICE, VALVE SYSTEM AND METHOD FOR ASSEMBLING A COUPLING DEVICE

CROSS REFERENCE TO RELATED APPLICATIONS

This patent application is a U.S. national stage application of international application No. PCT/EP2021/083796, filed Dec. 1, 2021, which claims priority to European Patent Application No. 20211319.7, filed Dec. 2, 2020, each of which is incorporated herein by reference in its entirety.

BACKGROUND

Field

The disclosure relates to a coupling device for connecting a drive shaft of an actuator to a driven shaft of an exhaust-gas valve. The disclosure also relates to a valve system comprising an actuator with a drive shaft, an exhaust-gas valve with a driven shaft and a coupling device. The disclosure further relates to a method for assembling a coupling device and to a method for assembling a valve system.

Related Art

Exhaust line valves are commonly provided with coupling devices to connect them with the actuators for their manipulation. Although a driven shaft of an exhaust-gas valve could in theory be directly coupled to the drive shaft of an actuator, such as an electric motor, a coupling device is usually employed as an intermediary component connecting the driven shaft and the drive shaft. The coupling device serves the general task of compensating tolerances due to manufacturing error or thermal expansion. Manufacturing errors can cause a drive shaft of the valve actuator and the driven shaft of the exhaust-gas valve to be misaligned in either one or several of an axial direction, a radial direction and/or an angular orientation. Furthermore, because the valve member of the exhaust-gas is subjected to temperatures of usually several 100° C. whereas the valve actuator requires an ambient temperature well below 100° C. to work properly for extended periods of time, the driven shaft is subjected to significant thermal stress because of the temperature gradient.

Exhaust systems for increased performance characteristics oftentimes include exhaust-gas valve to improve sound emission characteristics and engine power characteristics. Most systems comprise only two settings in accordance with a closed or fully opened valve flap position. In many cases, when the valve is closed, the sound volume is quieter whereas an opened valve leads to an increased sound volume. Many car enthusiasts prefer louder sound volume. However, exhaust-gas valve systems are required to be compliant with increasingly strict homologation rules. In order to optimize performance while ensuring compliance, exhaust-gas valve systems are demanded that can be controlled precisely to meet both the desired noise emission and engine performance criteria.

U.S. Pat. No. 10,060,360 B2 suggests the use of a coupling device comprising an elastic member axially compressed between a driven member and a driven member, wherein the elastic member urges the driven member into rotation by employing a torsional spring. The driving member and the driven member are connected exclusively via the elastic member that can expand and contract axially as well as in a circumferential direction. When the torque is exerted from the driving member towards the driven member exceeding the resistance of the elastic member, a driving tab of the driving member can engage either a first or a second edge of the driven member directly. The driving member and the respective driving shaft and driven shaft attached there too, respectively, are therefore rotatable relative to one another by the angular play between the driving tab and the opposing end portions of the raised edges. This play prohibits a precise positioning of the valve member or flap in a specific desired position during operation. Furthermore, whenever the direction of movement of the driving shaft is reversed, an unavoidable impingement sound is caused which can lead to a rattling noise.

In EP 2 180 167 B1, a coupling device is suggested that consists of an elastic spring directly coupling the drive shaft to the driven shaft. Especially under high thermal loads, however, it has been shown to work unreliably, because the springs' structural integrity is compromised so that valve positioning can become unreliable. Overheating can even cause the torsional spring to fail in case the admissible axial load is exceeded due to thermal stress. Furthermore, as the proposed valve using a coupling device is designed to bias the valve flap in its closed position against the valve seat, the valve flap can become damaged when used repeatedly due to the biasing force acting in addition to the closing force and in addition to thermal stress onto the circumference of the valve flap.

Especially in performance exhaust systems which experience rapid pulses of exhaust gas exiting the cylinders of a performance combustion engine, the pulses impact the valve member so that it starts to rattle due to the elasticity of spring connecting the drive shaft with the driven shaft or, in a worst-case scenario, even resonate with the exhaust gas pulses.

Another valve coupling device is proposed in DE 10 2019 120 959 A1. The coupling device is proposed as a bushing cooperating with a coil spring provided with rectilinear sections at the opposing ends of the spring. The rectilinear spring sections engage corresponding recesses of the bushing allowing rotational and translation degrees of freedom of the spring relative to the bushing. DE 10 2019 120 959 A1 seeks to avoid rattling noise when the direction of movement of the valve flap is changed by biasing the spring, however, rattling noise nevertheless occurs when rapid changes in movement or position are performed. The valve drive design of DE 10 2019 120 959 A1 is quite bulky and too large for some exhaust system design configurations. Due to bulkiness, the valve coupling device may cause valve drive to fail prematurely due to the large mass of the valve coupling device and because during prolonged operation, too much heat is transferred from the valve flap to the drive actuator.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise-respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, and components have not been described in detail to avoid unnecessarily obscuring embodiments of the disclosure.

An object of the disclosure is to overcome the disadvantages of the prior art and particularly to provide a valve system and a coupling device therefore with improved reliability, particularly in regard to spatial requirement, resistance to thermal loads, improved positioning, and decreased unwanted noise impact.

Accordingly, a coupling device is provided for connecting a drive shaft of an actuator to a driven shaft of an exhaust-gas valve. The actuator may in particular comprise an electric motor, such as a stepper motor, a servomotor, a brushed direct-current (DC) motor, an electrically excited DC motor, a permanent magnet DC motor, a brushless DC motor, a switched reluctance motor, a torque motor, a synchronous motor or the like. In one or more aspects, the actuator is a server motor or stepper motor. The driven shaft of the actuator transfers movement from the actuator towards driven components including an exhaust-gas valve. The drive shaft may be coupled directly to an electromagnetic component of the electric motor or coupled to an electromagnetic component of the motor via a reduction gear transmission.

The exhaust-gas valve comprises a valve member, such as a flap, attached to a driven shaft. The driven shaft is configured to receive a rotary motion and/or torque from the drive shaft of the actuator to transfer a torque and/or rotary motion towards the valve member. In one or more aspects, the valve member, in particular the valve flap, and the driven shaft are non-rotatably connected to one another; in other words, the driven shaft and the valve member are connected in a torque-proof manner. For instance, the valve member can be welded to the driven shaft, or the valve member and driven shaft may be forged as a single-piece unit. The valve member of the exhaust-gas valve is in particular configured to be movable within a tubular section of an exhaust tract for selectively opening or closing the section of the exhaust tract for the transmission of the exhaust-gas and/or sound. In particular, the exhaust-gas valve may comprise a tubular section of an exhaust system in which a flap is arranged, wherein the flap is dimensioned so that it can close the cube. The shape of the flap may correspond to the shape of the interior cross section of the tubular section. The driven shaft may be arranged perpendicular to the orientation of the tubular section. The driven shaft may be guided into the tubular section through an opening provided with a seal. The driven shaft defines a shaft axis around which the valve member can be rotated. The drive shaft defines a drive axis. In an exemplary embodiment of a valve system, the drive axis and the valve axis are coaxially aligned. Alternatively, the valve axis may be offset relative to the drive axis, in particular angularly offset and/or offset in the radial direction relative to the drive axis. A valve axis offset both radially and angularly in relation to the drive axis may be described as being skew in relation to the drive axis.

The valve member can be arranged within the tube section in a multitude of different positions in which the valve member fully closes the inner cross-section of the cube section or a position in which the obstruction caused by the valve member to exhaust-gas flowing through the tubular section is minimized. The valve member may be oriented within the tubular section in alignment with the middle-line of the tubular section so as to minimize the flow resistance caused by the valve member, particularly the flap, to the exhaust-gas. The valve member can be positioned in a multitude of different positions particularly between 0° relative to the middle line of the tube section and 90° relative to the middle line of the tube section. In the embodiment, the position of the valve member relative to the tube section of the exhaust-gas valve may be continuously variable, particularly in a stepless manner.

The coupling device is provided to transfer motion and/or torque from the drive shaft to the driven shaft. The coupling device itself defines a rotational axis. The coupling device further comprises a coupling rod received in the slot for translational movement of the rod relative to the retainer in the direction of the rotational axis. The coupling rod may move in the slot parallel to the rotational axis. The coupling rod is received in the slot in a play-free manner in a direction circumferential relative to the rotational axis. Furthermore, the coupling device comprises an clastic element, in particular a spring, biasing the coupling rod in the direction of the rotational axis and having an attachment section fixed to the retainer. The elastic element may have a first end firmly attached to the retainer at the attachment section of the elastic element. The attachment section of the elastic element may be a terminal end of a spring. The fixed attachment of the elastic element to the retainer may be provided for example by welding, soldering, molding, forging, gluing or the like. The coupling rod is biased by the elastic element in the direction of its translational movability within the slot. Any displacement of the coupling rod within the slot into a first, compression direction and/or second, tension direction parallel to the rotational axis is counteracted by a biasing force of the elastic element. The coupling rod may be a second terminal end of the elastic element, such as spring. The rotational axis of the coupling device is the axis around which its component rotates for transferring rotational movement from the drive shaft to the driven shaft. The rotational axis of the coupling device may be oriented either coaxially aligned with both the drive axis and the valve axis or angularly offset but radially aligned (crossing) both the drive axis and the valve axis. The coupling device compensates for any misalignment of the drive axis of the drive shaft in relation to the valve axis of the driven shaft.

The coupling device according to the disclosure comprises a torsionally rigid retainer having an axially extending slot. It shall be clear that the retainer provides sufficient rigidity such that no deformation of the retainer is caused by the operation of the exhaust-gas valve. Any torque transferred from the drive shaft to the driven shaft via the retainer causes virtually no deformation of the retainer. The maximum force of the actuator drive exerted upon the torsionally rigid retainer causes less than 1%, in particular less than 0.5%, preferably less than 0.1% deformation to the retainer in relation to its rotational axis. The retainer can be manufactured using one or several different manufacturing methods including turning, milling and/or sheet metal bending.

The retainer and the coupling rod are non-rotatably connected. The coupling rod may have no rotational play in the corresponding slot. Any translational movement of the rigid member is performed identically by the connection rod and vice versa. The coupling device according to the disclosure is configured such that any movement of the coupling rod around the rotational axis is accompanied by an identical rotary movement of the retainer around the rotational axis. Coupling rod and retainer rotate around the rotational axis as one. In particular, when the coupling device is connected to the exhaust-gas valve and the actuator, when the drive shaft causes the retainer to rotate about the rotational axis, the coupling rod is caused to perform the same rotary motion about the rotational axis as the retainer so that the coupling device may transfer rotary motion to the driven shaft. In an embodiment, the retainer is attached to the drive shaft and the coupling rod is attachable to the driven shaft. Alternatively, the retainer is attachable, to the driven shaft and the coupling rod is attachable to the drive shaft. In case of misalignment of the drive shaft in relation to the driven shaft, a coupling device may be configured to act as a cardan joint for connecting the drive shaft to the driven shaft.

A non-rotatable connection of the coupling rod to the retainer allows for directly transferring any change in rotary motion or position from the drive shaft to the driven shaft even in case of rapid change of direction thus allowing for rapid and precise positioning of the valve while avoiding any rattling noise. Separation into coupling rod and retainer also allows the coupling device to thermally decouple the hot exhaust-gas valve from the cool actuator while tolerating thermal expansion of the driven shaft.

In one or more aspects, the elastic element is compressible in the axial direction. Alternatively, or additionally, the elastic element is stretchable in the axial direction. The elastic element may include a particularly rod-like attachment section at its first axial end and the coupling rod at its second axial end.

In particular, the coupling device may consist of the elastic element, the coupling rod and the retainer. A rod-shaped attachment section or attachment rod may be oriented at an angle, preferably perpendicular in relation to the coupling rod. In relation to the rotational axis of the coupling device, the coupling rod may be oriented in a first crosswise direction and the attachment rod may be oriented in a second crosswise direction. By arranging the attachment rod and the coupling rod at an angle relative to one another, a cardanic function of the coupling device may be enabled.

In an embodiment of the coupling device, the slot has edges opposite one another, in particular opposite one another in a circumferential direction relative to the rotational axis of the coupling device, and extending in parallel to the rotational axis of the coupling device for guiding the coupling rod translationally and for transferring torque from the coupling rod to the retainer. The edges of the slot are configured for transferring torque from the retainer to the coupling rod as well. It may be preferred that the opposite parallel edges of the slot are distanced apart from another by a distance that essentially corresponds to the exterior width diameter, preferably of the coupling rod. By providing the slot with guiding edges opposite one another about a distance apart from another in accordance with the width or diameter of the coupling rod, the position of the valve member may be controlled precisely by the actuator. The actuator may not only reach an opened and/or closed end position of the valve but also in any intermedia reposition of the valve member. The edges of the slot may act as a sliding bearing guiding the coupling rod.

The width of the edges may be as broad as the width or diameter of the coupling rod or larger. In one or more aspects, the width of the edges is at least 0.2 times as large as, in particular at least 0.5 times as large as, preferably at least 0.8 times as large as the width of the coupling rod. Alternatively, or additionally, the width of the edges is no more than 5 times as large as, in particular no more than 2 times as large as, preferably no more than 1.5 times as large as the width of the coupling rod.

According to one embodiment of a coupling device, the elastic element attached to the retainer is free of torque and/or free of axial bias. The retainer and the elastic element may be adapted to each other such that they do not exert any torque, compression or tensile force onto one another in a resting state of the coupling element. In particular, the coupling rod is received within the slot and/or the attachment section is fixed to the retainer such that no torque and/or no axial force from the elastic element is entered into the retainer in a resting state of the coupling device. The resting state may in particular refer to a state in which the fully assembled coupling device is not attached to a driving shaft and/or not attached to a driven shaft of a valve assembly. The retainer and the elastic element may be form-fit to on another so that no torque, compression or tension bias is caused by the coupling device assembly. Alternatively, the retainer and the elastic element may be adapted to one another to exert a biasing force, such as a tensile force or a compression force, in the axial direction into one another but no torque.

In an embodiment of the coupling device, the elastic member comprises, particularly consists of, a coil spring, in particular a conical coil spring preferably having a narrow end fixed to the coupling rod and/or a wide end fixed to the attachment section, preferably the attachment rod. A retainer and a particularly conical coil spring can be coupled to each other in a space-saving manner. The shape of the coil spring may be preferred by a first particularly outer diameter at a first axial end of the coil spring, a second particularly inner diameter at a second axial end of the coil spring opposite to the first end, an axial extension of the coil spring, and a width, in particular a thread thickness, of the coil spring. In particular, the constant and/or maximum outer diameter of the coil spring is at least 20 mm, at least 25 mm or at least 30 mm. Additionally or alternatively, the constant and/or maximum outer diameter of the coil spring is at most 60 mm, at most 50 mm or at most 40 mm. In one embodiment, the constant and/or maximum outer diameter of the coil spring may be 36 mm±1 mm. The width of the spring, in particular a thread thickness, of the coil spring may particularly be constant. The width of the spring is particularly at least 1 mm, at least 1.5 mm or at least 2 mm. The width of the spring is particularly at most 3.5 mm, at most 3 mm or at most 2.5 mm. In particular, the width of the spring may be 2.5 mm±0.1 mm. A cylindrical coil spring may be configured with an axial height of at most 30 mm, particularly at most 25 mm or at most 15 mm. A cylindrical coil spring may be configured with an axial height of at least 7.5 mm, particularly at least 10 mm or at least 12 mm. The cylindrical coil spring ma have a pitch of at least 1.5 and/or at most 5, in particular 2-4. Advantageously, coil springs have relatively small second moment of area when moved around their rotational axis and may act as a thermal insulation in their axial direction to thermally separate the actuator from the exhaust-gas valve. Coil springs are also advantageous in that they can be designed to have little unbalance around the rotational axis. In one or more aspects, the coil spring circumferentially surrounds the retainer in relation to the rotational axis of the coupling device.

In one or more aspects, the coil spring may be a conical coil spring having narrow end fixed to the attachment section, particularly the attachment rod, and a wide end fixed to the coupling rod. A conical coil spring is defined having a conical shape wherein one first end of the coil spring is wider than the second end of the coil spring. The maximum outer diameter of a conical coil spring may particularly correspond to the above-mentioned dimensions of a generic coil spring. The minimum inner diameter of a conical coil spring may particularly be arranged at the opposite axial end in regard to the springs end realizing the maximum outer diameter. The minimum inner diameter of a conical coil spring is smaller than the maximum outer diameter minus the spring width. In particular, the minimum inner diameter of a conical coil spring is at least 10 mm, or at least 15 mm. Alternatively or additionally, the minimum inner diameter of a conical coil spring is no more than 30 mm, no more than 25 mm or no more than 20 mm. In particular, the minimum inner diameter of the conical coils spring is approximately 16 mm±1 mm. A conical coil spring may be configured with an axial height of at most 30 mm, particularly at most 25 mm or at most 22.5 mm. A conical coil spring may be configured with an axial height of at least 10 mm, particularly at least 15 mm or at least 20 mm. The conical coil spring ma have a pitch of at least 2 and/or at most 10, in particular 4-6.

In a further development of the coupling device that may be combined with the aforementioned embodiments, the elastic element, particularly a coil spring and the coupling rod, are formed in a one-piece manner, in particular as a thread, preferably of a constant diameter. The coupling rod and the remaining elastic element, in particular coil spring, can have a constant thread diameter along the entire extension of the thread. A coupling device having an elastic element comprising an attachment rod as its attachment end may have the same, constant thread diameter of the coupling rod also at the attachment rod. It may be preferred that the elastic element including the attachment rod and the coupling rod is formed a one-piece manner. In particular, the thread section forming the rectilinear coupling rod and the thread section forming the rectilinear attachment rod are arranged across one another, particularly at an angle of 90°. A coupling rod and the attachment rod may alternatively be arranged in parallel to one another. In one or more aspects, the angle between the coupling rod and the attachment rod is smaller than 60°, particularly smaller than 30°, most preferably smaller than 10°. Such a coupling device may particularly consist of the coil spring including the coupling rod and the rigid retainer.

In accordance with an embodiment of the coupling device that may be combined with previous embodiments, the retainer comprises, particularly consists of, a sheet metal part having a central section and two folds bend towards a first direction relative to the central section, preferably a first direction parallel to the axis of rotation, wherein two folds form the slot for holding the coupling rod. Using singular sheet metal part for providing the retainer of the coupling device has been shown to provide the most torsional rigidly at the least weight. The central element of the sheet metal retainer may be flat and cross the rotational axis of the coupling device. The fold or folds of the retainer may extend in parallel to the axis of rotation and diametrically opposite one another in a radial direction relative to the rotational axis. The axially extending slots may thus be formed in the axially extending flaps. The coupling device may be provided with void spaces in the circumferential direction between the flaps so as to avoid unnecessary weight and to improve thermal insulation. The flaps extending from the central part of the rigid retainer may act as pairs of guiding posts surrounding respective slots in which the connection rod is guided. The flaps forming the edges of a slot may act as guide rails for the sled like coupling rod arranged therebetween. It may be preferred that the retainer has two diametrically opposite slots for receiving one coupling rod, wherein the slots are arranged diametrically opposite of one another in relation to the rotational axis so that no unbalance is caused rotating the coupling rod around the rotational axis. In such an embodiment, the flaps of the retainer may be positioned diametrically opposite one another in relation to the rotational axis to avoid unbalance, too. In one or more aspects, the retainer has two opposing folds each including one respective slot for receiving the same coupling rod. The retainer may comprise one or more void spaces arranged along the retainer's circumference next to one or more folds. A void space between circumferentially adjacent folds may be have a circumferential extension at least as long or larger than one respective adjacent fold. In one or more aspects, at least 50%, at least 60% or at least 75% of the circumferential extension of the retainer in a plane perpendicular to the rotational axis A is realized by one or more void spaces between adjacent folds.

In a further embodiment of a coupling device the retainer comprises a sheet metal part having a central section and two seams bent towards a second direction, preferably a second direction parallel to the axial direction, relative to the central section, wherein the seams form at least one recess for holding the attachment section. It may be preferred that the retainer has a central section from which two folds extend into a first direction and from which two seams extend towards a second direction different from the first direction, preferably opposite to the first direction. The central section can be designated as saddle section. The first direction may for case of reference be called "downwards", whereas the second direction can be designated as "upwards". It shall be clear, that a coupling device having seams does not require in all cases any protrusions on the upper side first side or of the central section such as folds. In case of an attachment rod forming the attachment section, the recess may be designed to hold the attachment rod. The attachment section may be firmly fixed to the seams of the retainer, for example by welding, molding or gluing. The recess may be a U-shaped opening, extending opposite-wise in relation to the slots of the retainer. Alternatively, at least one or all recesses of the retainer may form a closed circular (O-shaped) opening open only in one direction crosswise relative to the rotational axis so that any relative movement of the attachment section, preferably the attachment rod, in a direction in parallel to the rotation axis or circumferentially relative to the rotational axis is prohibited by the form-fitting engagement of the at least one recess and the attachment section. The retainer may comprise one or more void spaces arranged along the retainer's circumference next to one or more seams. A void space between circumferentially adjacent seams may be have a circumferential extension at least as long or larger than one respective adjacent seam. In one or more aspects, at least 50%, at least 60% or at least 75% of the circumferential extension of the retainer in a plane perpendicular to the rotational axis A is realized by one or more void spaces between adjacent seams.

In accordance with an alternative embodiment of a coupling device devoid of seams, which may be compatible with one of the previously mentioned embodiments, the retainer has a central plate section between the folds wherein the central plate section is connected directly to the attachment section. Providing a central plate section to the retainer which preferably crosses the rotational axis, allows for the attachment section, in particular the attachment rod, to be attached to the central plate section on the rotational axis or in close proximity thereto, for example by welding, molding or gluing. The central plate section of the retainer may be provided with a rectilinear attachment bridge that can be arranged in accordance with the attachment section, particularly the attachment rod, to allow, for a mutual engagement of the attachment section and the attachment bridge to a corresponding engagement portion of the drive shaft or driven shaft.

In an alternative embodiment, the retainer may comprise or consist of a hollow cylindrical body in particular a cylindrical body having a constant diameter or a cylindrical body having a stage diameter comprising at least a middle section including a recess and a wide section including the slot. A hollow cylindrical body may be easy to manufacture from a tubular body and can provide a high amount of torsional rigidity with relatively little wall thickness while, at the same time having only a small second moment of area. The hollow cylindrical body may be of circular cylindrical shape. Alternatively, the hollow cylindrical body may have at least two staged sections, one having a narrow diameter and one having a wide diameter, in relation to one another, wherein the narrow section includes the at least one recess for holding the attachment section of the elastic element and wherein the wide section includes the slot for receiving the coupling rod. In particular, in combination with an elastic element formed as a conical coil spring, a retainer having a staged cylindrical body allows to minimize the required space of the coupling element. A staged cylindrical body can have one or more intermediary stages between the narrow diameter section and the wide diameter section. The wall strength of the hollow cylindrical body may be constant in all stages. A staged hollow cylindrical body may have a conical shape tapering from the narrow section to the wide section. A hollow cylindrical body can be sleeve-shaped with two opposite open ends and a through bare there between, or it may be cup- or can-shaped with sections closing either end or both ends. The retainer may comprise one or more void spaces arranged along the retainer's circumference in the cylindrical body. A void space between circumferentially adjacent recesses and/or slots may be have a circumferential extension at least as long or larger than one, two or more adjacent cylindrical body sections. In one or more aspects, at least 50%, at least 60% or at least 75% of the circumferential extension of the retainer in a plane perpendicular to the rotational axis A is realized by one or more void spaces between adjacent cylindrical body sections.

In particular, the wall thickness of a sheet metal retainer and/or of a retainer having a cylindrical body is at least 0.5 mm, at least 0.75 mm or at least 1 mm. The wall thickness of the retainer is particularly at most 3 mm, at most 2.5 mm or at most 2 mm. In particular, the wall thickness may be 1.5 mm±0.1 mm.

In a particular embodiment of a coupling device, the retainer includes at least one void space or more void spaces extending along the direction of the rotational axis. In particular, one or more void spaces may extend between cylindrical body sections of the hollow cylindrical body. Alternatively, one or more void spaces may extend between adjacent folds and/or seams. In one or more aspects, a void space between circumferentially adjacent folds, seams or body sections may be have a circumferential extension at least as long or larger than one respective adjacent fold, seam or body section. A void space serves as a cooling element and/or to decrease the thermal mass of the retainer so as to improve thermal insulation between the coupling rod and the attachment section.

Another aspect of the disclosure relates to a valve system comprising an actuator with a drive shaft, an exhaust-gas valve with a driven shaft and a coupling device connecting the driven shaft to the drive shaft with axial clearance. The coupling device may in particular be configured as described above. The coupling device may provide axial clearance, radial clearance and/or angular clearance, but no rotational clearance due to the connection between the driven shaft and the drive shaft, thus transferring any rotary motion of the drive shaft around the drive axis into a corresponding rotational movement of the driven shaft around the valve axis. In one or more aspects, the magnitude of the rotational movement of the drive shaft is transferred into a corresponding, preferably equal rotational movement of the driven shaft. The coupling member may act as a cardan joint between the driven shaft and the drive shaft, thus transferring rotational movement of the drive shaft into rotational movement of the driven shaft around the valve axis in accordance with a predetermined motion function known to the person skilled in the art. The coupling device provides a torque-proof or rotationally rigid joint between the drive shaft of the actuator and the driven shaft of the exhaust-gas valve, thereby allowing a precise positioning of the exhaust-gas valve member by the actuator and avoids rattling noise.

In a further development of the valve system, the attachment section of the elastic element and/or the section of the retainer fixed to the attachment section is connected with the drive shaft. In an embodiment in which the retainer comprises a central plate section including an attachment bridge, both the attachment bridge and the attachment section can be engaged by an engagement portion of the drive shaft, so as to transfer rotary motion from the drive shaft directly to the attachment bridge and attachment section for joint movement of the retainer and the elastic element free of rotational play therebetween. By connecting the attachment section of the elastic element or at least a correspondence section of the retainer directly coupled thereto to the drive shaft, the rotary motion of the drive shaft can be directly transferred to the coupling device.

In a further development of the valve system, that can be combined with the previously mentioned one, the system comprises an adapter for form-fittingly engaging the drive shaft or driven shaft, in particular an engagement portion of the drive shaft or of the driven shaft, wherein the adapter surrounds the attachment section of the elastic element. The adapter may fully circumferentially or partially circumferentially surround the attachment section, preferably an attachment rod. The adapter may be an annular sleeve or U-shaped bushing for providing a form-fitting engagement to both the attachment section and the drive shaft or driven shaft. As the actuator may be a mass-produced electric motor, the engagement section of the drive shaft may be formed corresponding to electromotor manufacturer standards wherein different actuators from different manufacturers may have different dimensions. A correspondingly shaped adapter may aid to adapt the size of the attachment section, particularly the attachment rod, which may be defined by the thread diameter of a spring coil to a corresponding reception on the drive shaft. By providing an adapter between the attachment section and the engagement section of the drive shaft or driven shaft, a true torque transfer, free of play, may be provided in a simple manner. Alternatively, or additionally, a coupling adapter may be provided to the coupling rod and a corresponding engagement section of the driven shaft or driving shaft.

According to one embodiment of the valve system, the drive shaft and/or the driven shaft realizes one single or two respective contact lines with the corresponding engagement portion of the coupling device, in particular the coupling rod, the attachment section or the section of the retainer fixed to the attachment section. The drive shaft or the driven shaft may particularly realize one single contact line with the corresponding portion of the coupling device, particularly a thread-shaped rod section of the coupling rod or the attachment section. In an exemplary embodiment, the upper contact with the drive may be realized by one single contact line with the attachment section and the lower contact with the driven shaft is realized by one single contact line with the coupling rod. Alternatively, or additionally, the drive shaft or the driven shaft may particularly realize two radially opposite contact lines with the section of the retainer fixed to the attachment section. In one or more aspects, the upper contact of the coupling device with the drive shaft is realized by two contact lines.

According to one embodiment of the valve system torque is transferred from the drive shaft to the driven shaft through the rigid retainer. In one or more aspects, torque is exclusively transferred from the drive shaft to the driven shaft through the rigid retainer. In particular, even in case of torque transfer from the drive shaft to the driven shaft, the elastic element remains free from torque due to the torque transmission through the rigid retainer. In particular, a helical section of a coil spring may be free from torque. For example, torque received at the coupling rod or the attachment section is transferred into the retainer and through the retainer to the other one of attachment section or coupling rod, thereby relieving the elastic element from experiencing torque. The elastic element may in particular be tensioned in the direction of the rotational axis when attached to the shafts alongside the torque transmitting rigid retainer.

Alternatively, in the mounted state of the valve system, the elastic element may remain free of tension, in particular free of compression bias and/or ductile bias.

The disclosure also relates to a method for assembling a coupling device such as the coupling device described above. The assembly method may comprise the following steps:
 (a) providing retainer, comprising a slot and a recess;
 (b) providing a coil spring comprising a coupling rod and an attachment section;
 (c) fitting the coupling rod into the slot of the retainer; and
 (d) fitting the attachment section into the recess of the retainer.

Unlike prior art assembly methods which are quite complicated in the burdensome, the design of the above-mentioned coupling device allows for a particularly simple and fast attachment of the coupling device. It is advantageous that the assembly according to the above-mentioned method can alternatively include the performance step (c) before step (d) or the performance of step (d) before step (c). The assembly method can be performed by fitting the coupling rod into the slot of the retainer first and thereafter fitting the attachment section into the recess of the retainer. Alternatively, the assembling method can be performed by fitting the attachment section into the recess of the retainer first and thereafter fitting the coupling rod into the slot of the retainer. It may be advantageous to first fit and possibly secure either the coupling rod or the attachment section of the coil spring to the slot or recess of the retainer so that the possibility of the coil spring to move in relation to the retainer is limited that the coil spring and the retainer become easier to manipulate in relation to each other, for example in order to exert a tensioning force onto the spring to elongate the spring or to compress the spring, thereby making it easier to fit the other part, i. e. the attachment section or coupling rod, into the respective receptacle, the recess or slot, or the retainer.

In one embodiment, the retainer is rotated within the coil spring between step (c) and step (d). It shall be clear that the rotation of the retainer within the coil can occur either after step (c) and before step (d) or after step (d) and before step (c). In one or more aspects, the retainer may be rotated from a first axial alignment within the coil spring to a second axial alignment within the coil spring. An axial alignment of the coil spring and the retainer occurs for example when the rotary axis of the retainer and a symmetry axis of the coil spring align, preferably coaxially. By providing the retainer within the coil spring the overall second momentum of area of the coupling device is reduced by bringing the relatively solid massive retainer closer to the axis of rotation of the coupling device. At the same time, arranging the coil spring outside of the retainer surrounding the retainer allows for more flexibility of the coil spring for elongation in the axial direction as well as for contracting in the radial direction or, for example in case of a cone-shaped coil spring, as subsequent windings of the coil spring can be received radially within one another in a spiral-shaped manner to allow the coil spring for larger range of elastic deformation in the axial direction in relation to the overall size of the coupling device. The provision of the retainer within the coil spring allows the coupling device to be made in a generally, light weight and compact design.

According to a further development of an assembly method, the retainer is moved translationally along its axis along the attachment section or along the coupling rod at least once before, during and/or after the rotation. The assembling method may make use of the circumstance that the slot receiving the coupling rod and/or the recess receiving the attachment section may be provided with an opening which extends longitudinally in the axial direction of the retainer. The coupling rod and slot may experience a translational relative motion relative to one another in the axial direction of the retainer. Alternatively, or additionally, during the assembly process, the attachment section and the recess max experience a translational movement relative to one another along the axis of the retainer. The relative movement in the axial direction of the retainer may occur completely or in part during the rotation of the retainer within the coil spring, before the beginning of the rotation or after the completion of the rotation. It may be preferred that a translationally rotational movement of the retainer in relation to the coil spring occurs wherein the translational movement along the axis of the retainer and the rotational movement preferably within the coil spring preferably around the attachment section or around the coupling rod are performed simultaneously. In particular, the coil spring may be extended during the rotation, preferably for the entire duration of the rotation or during a portion of the time which it takes for the retainer to be rotated within the coil spring. By allowing the retainer to move along its axis in relation to the coil spring it becomes possible to fit and rotate a relatively large retainer within the coil so as to be able to provide a retainer structure with a relatively large amount of rigidity for the torsionally rigid transmission from the driven shaft to the drive shaft.

The disclosure furthermore relates to a method for assembly of a valve system such as described above. The valve system assembly method particularly comprises the coupling device assembly method as described above. During the valve system assembly method, the elastic element may be compression-biased in the axial direction when attaching the coupling device to the actuator and to the exhaust-gas valve. The coupling device shall be prepared before it is mounted to the actuator or the exhaust-gas valve. It may be preferable to attach the finished coupling device first to the actuator and thereafter to the exhaust-gas valve or vice versa. After the coupling device is attached to either one of the actuator or the exhaust-gas valve, it will be compressed before attaching it to the other one of the exhaust-gas valve or the actuator. In one embodiment, the elastic element of the coupling device may remain compression-biased after the coupling device has been attached to both the actuator and the exhaust-gas valve. In another embodiment, after having been attached to both the actuator and the exhaust-gas valve, the elastic element of the coupling device is allowed to decompress such that no compression-bias or substantially no compression-bias of less than 10% compression-bias, preferably less than 1% compression-bias remains.

A coupling device (coupler) according to the disclosure is generally designated with reference numeral 1. The coupling device 1 comprises as its main constituents a torsional rigid retainer 2 and an elastic element 4. The valve system according to the disclosure is generally designated with the reference numeral 7. The valve system comprises as its main constituents an actuator 3, an exhaust-gas valve 5 and a coupling device 1.

Figure 1:
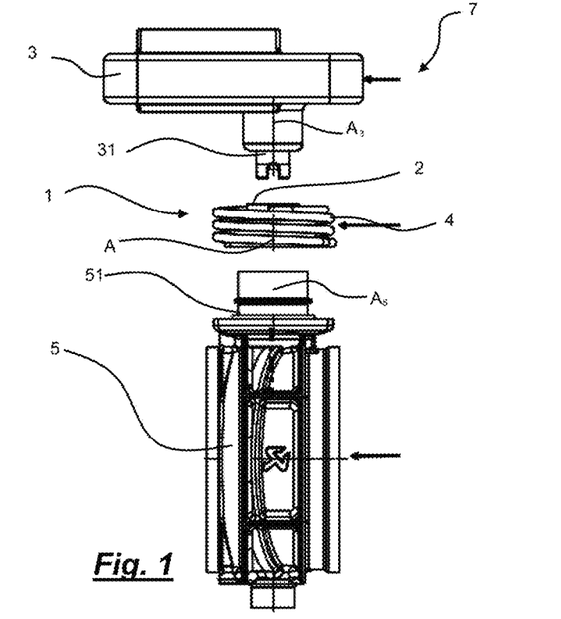
FIG. 1 shows a valve system according one or more aspects of the disclosure including an actuator, an exhaust-gas valve and a coupling device.

In the exemplary embodiment shown in FIG. 1, the valve system 7 comprises the coupling device 1 interposed between an actuator 3 and an exhaust-gas valve 5 for transferring rotary motion from the actuator 3 to the exhaust-gas valve 5. The actuator 3 has a drive shaft 31. The exhaust-gas valve 5 has a driven shaft 51. The coupling device 1 connects the drive shaft 31 to the driven shaft 51 to transfer force and/or motion from the actuator 3 to the exhaust-gas valve 5.

The coupling device 1 provides an axial clearance to allow for thermal expansion or the like of the exhaust-gas valve. The coupling device 1 may be configured particularly as cardanic element to compensate any radial offset between the axis A3 of rotation of the drive shaft 31 and the axis A5 of rotation of the driven shaft 51. That is, in case the axis A3 of the actuator 3 is not coaxially aligned with the axis A5 of the exhaust-gas valve 5, but offset in radial direction such a radial offset may be compensated by the coupling device 1.

Alternatively, or additionally, the valve coupling device 1 may be configured to compensate an angular offset between the axis A3 of rotation of the actuator 3 and the axis A5 of rotation of the exhaust-gas valve 5. For example, if the valve's axis A5 of rotation is tilted or skewed in relation to the actuators 5 axis A5, the coupling device 1 compensates for the misalignment and connects the valve 5 to the actuator 3 in a non-rotational manner.

A non-rotational connection between two components, such as the drive axis 31 and the driven axis 51 causes the two non-rotatable connected components to rotate dependently of one another without any rotational play. When one of several none-rotatably coupled components rotates in relation to a reference object, the other components non-rotatably coupled also perform a forced rotational movement in relation to the reference object.

When the drive shaft 31 and the driven shaft 51 are non-rotatably coupled to one another, any and all rotation of the drive shaft 31 causes a corresponding rotational movement of the driven shaft 51 and vice versa. The skilled person is aware that in case of a significantly skewed misalignment of the actuators' axis A3 in relation to the valve's 5 axis A5, the corresponding rotary motion of the shafts 31, 51 is determined by the properties of the cardanic connection therebetween. As the non-rotatable connection is free of play it prohibits any rattling noise due to looseness of the exhaust-gas valve's 5 flap.

Figure 2A:
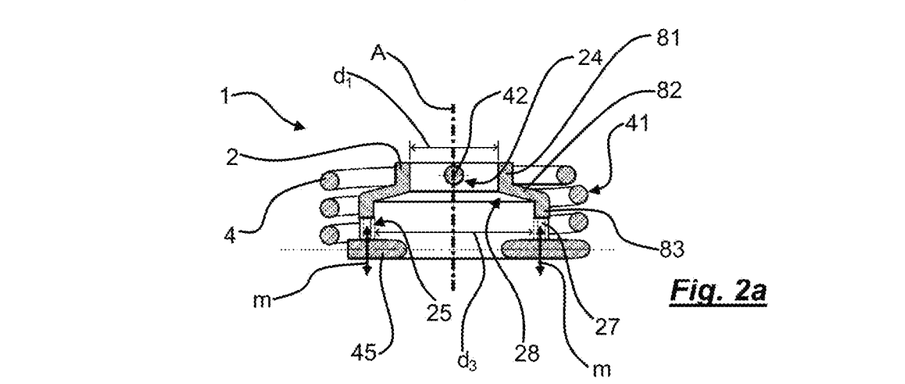
FIGS. 2a-c show different views of a coupling device according to one or more aspects of the disclosure.
Figure 2B:
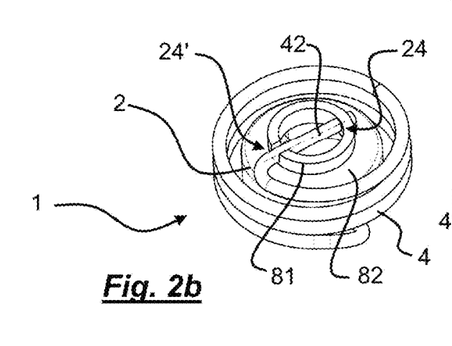
Figure 2C:
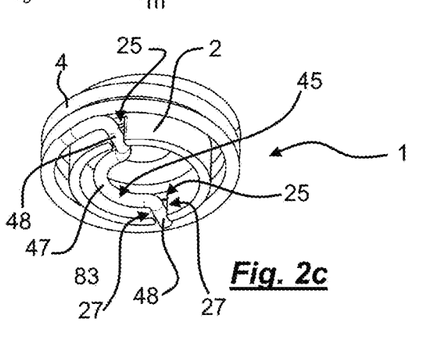

A first embodiment of a coupling device 1 is shown in a sectional view in FIG. 2a and in two different perspective views in FIGS. 2b and 2c. In this embodiment, the elastic element 4 of the coupling device 1 is realized as a hollow cylindrical coil spring 41. The coil spring 41 has a first terminal end realizing the attachment section 42. The second terminal end of the coil spring 41 realizes the coupling rod 45.

The torsional rigid retainer 2 is coupled to the elastic element 4. The retainer 2 consists of a hollow cylindrical body 28 having a staged diameter. In the present embodiment, the cylindrical retainer in a body 28 has a narrow section 81 and a wide section 83. The wall thickness of the cylindrical body 28 is essentially constant. The inner diameter d1 of the narrow section 81 is smaller than the inner diameter d3 of the wide section 83. The cylindrical body 82 comprises a conical step section 82 connecting the narrow section 81 to the wide section 83. The wide section 83 has a larger axial extension along the rotational axis A of the retainer 2 than the narrow section 81 and than the conical section 82, preferably at least as large as the complete axial extension of the narrow section 81 and the conical section 82 combined. The cylindrical body 28 may be provided with one or more void sections, for example in the cylinder body sections forming the wide section 83 and/or in the cylinder body sections forming the narrow section 81 (not shown).

The narrow section 81 includes a circular recess 24 which may circumferentially completely surround the attachment section 42 received therein. Optionally, the retainer 2 may additionally comprise a U-shaped axially open recess 24'. The open recess 24' may be arranged diametrically opposite to the recess 24. The attachment section 42 of the elastic element 4 may be fixed to the retainer 2 by welding. The attachment section 42 is inserted into the recess 24 of the retainer 2 and the elastic element 4 is fixed to the retainer 2 and the position of the recess 24 receiving the attachment section 42 to prohibits relative movement of the elastic elements '4 attachment section 42 in relation to the retainer 2.

Once the attachment section 42 of the elastic element 4 is fixed to the retainer 2, only the coupling rod 45 remains movable in relation to the retainer 2.

As indicated with arrows m, the coupling rod 45 of the elastic element 4 can move in parallel to the axial direction A of the coupling device 1 defined by the retainer 2. However, in the circumferential direction relative to the rotational axis A of the coupling device 1, the coupling rod 45 is prohibited from rotational movement in relation to the retainer 2. The coupling rod 45 is received within a slot 25 of the retainer such that the rod 45 can only move relative to the retainer 2 in the direction parallel to the rotational axis A. In case torque is exerted onto the coupling rod, the coupling rod 45 transfers the torque to the edges 27 of the slot 25. The edges 27 of the slot 25 are arranged opposite one another in the circumferential direction regarding to the axis A of rotation and are distanced apart from one another in a distance corresponding to the width of the coupling rod 45. The coupling rod 45 is guided by the edges 27 of the slot 25 so that the coupling rod 45 is movable in the direction of the rotational axis A but not in a direction circumferentially in relation to the rotational axis A. The edges 27 of the slot 25 may act as a sliding bearing for the coupling rod 45.

As the elastic element is fixed at its attachment section 42 to the retainer 2, for example by welding, gluing, over molding or the like, and as the coupling rod 45 is received within the slot 25 substantially without play, the elastic element 4 is non-rotatably connected to the rigid retainer 2. Thus, any torque exerted upon the coupling rod 45 or the attachment section 42 from an external influence is transferred to the torsional rigid retainer. For example, when the torque is received by the coupling rod 45, the coupling rod 45 transfers the torque through the edges 27 of the slot 25 and to the body of the retainer 2. The retainer is designed so torsional rigid that at least during normal operation no torsional deformation of the retainer 2 occurs. It may be preferred that the retainer 2 is designed sufficiently torsional rigid that the maximal torque which the actuator 3 may provide via the drive shaft 31 to the coupling 1 causes a torsional deformation of the retainer 2 of less than 0.1% or less than 0.01%. The torque received by the retainer 2 from the coupling rod 45 may be transferred via the retainer's body 28 to the attachment section 42.

The slots 25 are arranged in the wide section 83 of the retainer 2. The axial extension of the slot 25 within the cylindrical body 28 of the retainer 2 is larger than the axial width of the coupling rod 45, preferably the diameter, in particular at least 1.5 times as large as the axial width or at least 2 times as large as the axial width of the coupling rod 45. The axial extension of the slot 25 within the cylindrical body 28 of the retainer 2 is less than 10 times, preferably less than 5 times, more preferably less than 3 times the axial width, preferably the diameter of the coupling rod 45. The axial extension of the slot 25 within the bottom of the retainer 2 is less than half the axial extension of the retainer 2. In the assembled state of the coupling device 1, preferably the assembled state of the valve system 7, the coupling rod 45 is completely received within the slot 24 in the direction of the rotational axis A. It shall be clear that the terms "direction of the rotational axis" and "axial direction" are used synonymously within this disclosure.

Figure 3A:
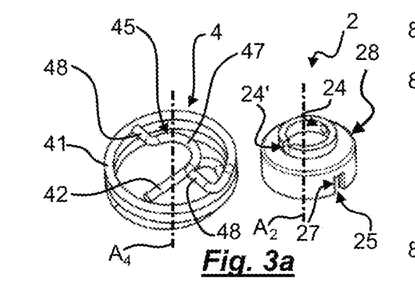
FIGS. 3a-3f show a sequence of stages of assembly of the coupling device of FIGS. 2a-2c according to one or more aspects of the disclosure.

FIGS. 3a-3f illustrate a sequence for attaching the elastic element 4 to the retainer 2 thereby assembling the coupling device 1. FIG. 3a shows the coupling devices individual components, its torsional rigid retainer 2 and its elastic element 4 next to one another before assembly.

The elastic element 4 in this embodiment is realized as a cylindrical coil spring 41 having two terminal end sections which are end in relation to the helical spring body of the coil spring 41 such that the terminal ends extend in a generally radial direction in relation to the axis of rotation A4 of the coil spring 41. The first terminal end of the coil spring 41 forming the attachment section 42 extends inwardly from the helical spring rod in a rectilinear, rod-like manner. The second terminal end realizing the coupling rod 45 has sections extending radially inward in a rectilinear-rod-section-like fashion 48 and additionally an arc-section 47 realizing a curved portion between the rod sections 48.

The rectilinear rod section 48 of the coupling rod 45 and the rectilinear rod portion forming the attachment section 42 are arranged at an orthogonal angle in relation to one another. The rectilinear attachment section extends in a first radial direction in relation to the rotational axis A and the rectilinear sections 48 of the coupling rod 45 extend in a second radial direction in relation to the rotational axis A. Such an arrangement of the coupling rod 45 in relation to the attachment section 42 is helpful in allowing the coupling device 1 to act as cardanic joint.

Figures 3B, 3C:
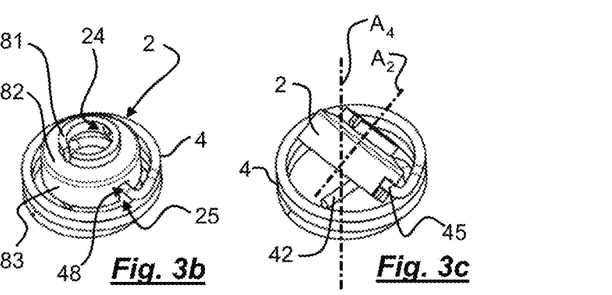

FIG. 3b shows the retainer 2 set on top of the coupling rod 45 of the elastic element 4 wherein the rectilinear sections 48 of the coupling rod 45 are received into slots 25 in the wall of the cylindrical body 28 of retainer 2 diametrically opposite one another in relation to the retainer's axis of rotation A2. When the retainer 2 is set on top of the elastic element 4 as shown in FIG. 3b, the rotational axis or axis of symmetry A4 of the elastic element 4 and the retainers 2 rotational axis A2 may be coaxially aligned. At this point during the assembly of the coupling device 1, the attachment section 42 is not yet received within the recesses 24, 24'.

FIG. 3c shows how the retainer 2 is being rotated around the coupling rod 45 within the coil spring 41. The coil spring 41 has a constant outer diameter of approximately 36 mm. The hollow cylindrical body 28 of the retainer 2 having a staged diameter, raising a narrow section 81, a cone-shaped section 82 and a wide section 83 has been described above. During the rotation of the retainer 2 around the coupling rod 45 in the coil spring 41, the arc section 47 secures the retainer from sliding off the coupling rod 45 in the radial direction. The arc section 47 has an extension of essentially 180° around the rotational axis A. The arc section 47 and the rod sections 48 are formed by the coil spring thread and has the same thickness as the remaining coil spring 41 of approximately 1.5 mm. The outer diameter of the arc section is approximately 17 mm.

Figure 3D:
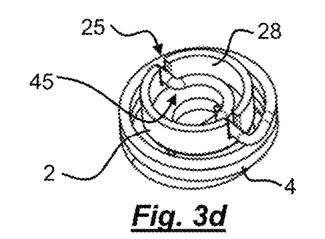

FIG. 3d shows the retainer 2 having been rotated around the coupling rod 45 so that the section of the retainer's body 28, in this case the narrow section 81, which at first pointed away from the attachment section 42 now points towards the attachment section 42. While the retainer 2 in the stage shown in FIG. 3b was positioned predominantly outside of the coil spring 41, it is in the stage shown in FIG. 3d arranged predominantly within the coil spring 41. In case the attachment section 42 is not inserted into the corresponding recess 42 the spring 41 may be elongated in the direction of the rotational axis A.

Figure 3E:
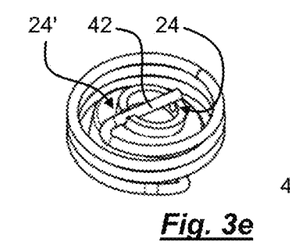

FIG. 3e shows the elastic element 4 and the retainer 2 in essentially the same state as FIG. 3d. The attachment section 42 is not completely inserted into the corresponding recess 24 so that the axis A2 of the retainer is slightly tilted in relation to the axis of the spring A4. In order to insert the attachment section 42 into the recess 24, the attachment section may be biased towards the outside of the coil spring 41 so that the terminal end of the coil spring 41 forming the attachment section 42 may thereafter slide into the recess 24 in the radial direction. Thereafter, the attachment section 42 can be firmly attached and thereby fixed to the retainer 2.

Figure 3F:
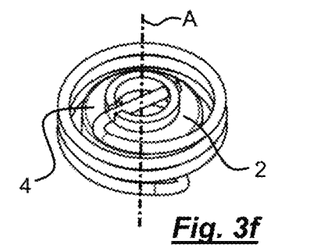

FIG. 3f shows the final assembly state of the coupling device 1 in which the attachment section 42 is received within the recesses 24, 24' of the retainer 2 and wherein the coupling rod 45 is arranged within the slots 25. In this state, the rotational axis A2 of the retainer and the rotational axis A4 of the spring may be concentrically aligned to realize the rotational axis A of the coupling device 1.

Figure 4A:
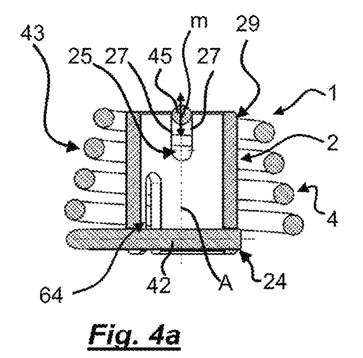
FIG. 4a shows a coupling device according to one or more aspects of the disclosure.

A different embodiment of a coupling device 1 is shown in a sectional view in FIG. 4a and in two different perspective views in FIG. 4b and FIG. 4c. The assembly of the coupling device 1 in accordance with FIG. 4a may be performed in the same manner as the previously described assembly of the coupling device in accordance with FIGS. 2a through 3f. Alternatively, in order to assemble the elastic element 4 and the retainer 2 of the coupling device 1 according to FIG. 4a to one another, the attachment section thereof may first be put into a recess 24 and the retainer 2 may then be rotated within the coil spring 43 such that, thereafter, the coupling rod 42 may be inserted into a respective slot 25. Such an assembly method is described below regarding the coupling device shown in FIGS. 6a through 7e.

In the embodiment shown in FIG. 4a, the shapes of the retainer and the elastic element 4 are somewhat different than those of the before mentioned embodiment but otherwise the function of the coupling device 1 according to FIG. 4a and the structure thereof corresponds to that of the previously described embodiment. The cylindrical body 29 is formed with a void space 64 extending in the axial direction A through the cylindrical body 29 in addition to the recesses 24 and slots 25. The void space 64 separates body sections of the cylindrical body 29 in the circumferential direction and acts as a thermal barrier for heat insulation between the attachment section 42 which may be attached to a hot valve and the coupling rod 45 which may be attached to a drive actuator.

The retainer 2 consists of a hollow cylindrical body having a continuous constant inner and outer diameter. The width of the walls of the hollow cylindrical body 29 is approximately the same as the width of the thread forming the coil spring 40. The wall strength of the hollow cylindrical body 29 may be between 0.5 times as large as the width of the threat of the coil spring 43 and 2.5 times the threat width.

The elastic element 4 according to the embodiment of a coupling device 1 shown in FIG. 4a is realized as a conically-shaped coil spring 43 sloping from a wide end, at which the coil spring 43 terminates in the attachment section 42, towards a narrow end at which the coil spring 43 terminates in the coupling rod 45. The wide end of the conical coil spring 43 has an outer diameter of approximately 35.5 mm. The narrow and of the conical coil spring 43 has an inner diameter of approximately 16.5 mm. The width or diameter of the thread forming the coil spring 43 is approximately 1.5 mm. Both the coupling rod 45 and the coupling section 42 of the elastic element 4 according to the embodiment shown in FIG. 4a consist of rectilinear rod sections 48. The rod sections 48 forming on one hand the attachment section 42 and on the other hand the coupling rod 45 extends perpendicular in relation to one another so that the coupling device 1 may act as a cardanic element.

Figure 5A:
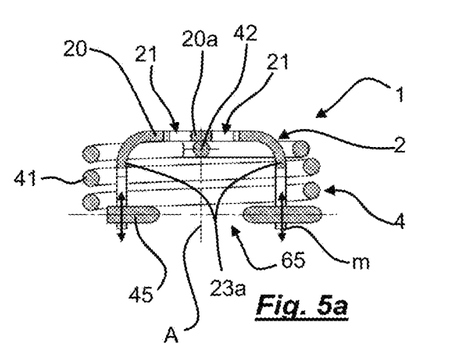
FIGS. 5a-5c show a coupling device according to one or more aspects of the disclosure.

FIG. 5a shows a third embodiment of the coupling device 1. The elastic element 4 of the coupling device 1 shown in FIG. 5a is essentially identical to the previously described elastic element of the embodiment shown in FIG. 2a through 3f.

Figure 5B:
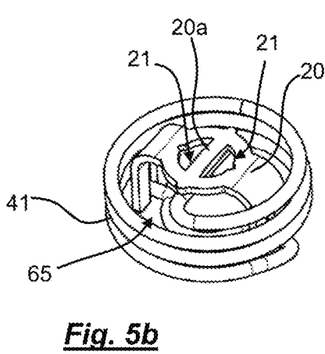

The retainer 2 is realized as a bent sheet metal body comprising folds 23 bent in the direction of the rotational axis A. The sheet metal part shown in FIG. 5a through 5c has a first central section 20 extending in radial plane in relation to the rotational axis A and two folded sections 23a protruding from the central section 20 in the direction of the rotational axis A.

The coupling device 1 as shown in FIG. 5a has a retainer consisting of a sheet metal part. The central section 20 is fixed to the attachment section 42 of the elastic element 4. The central section 20 can for example be welded, glued or otherwise firmly attached to the attachment section 42 of the elastic element 4. In the exemplary embodiment as shown in FIG. 5a, the elastic element is realized as a coil spring 41 of constant diameter. The elastic element 4 and the attachment section 42 as well as the connection rod 45 thereof are made from a threat of constant diameter. The elastic element 4 of the embodiment shown in FIG. 5a essentially corresponds to the elastic element of the embodiment shown in FIGS. 2a through 3f.

Figure 5C:
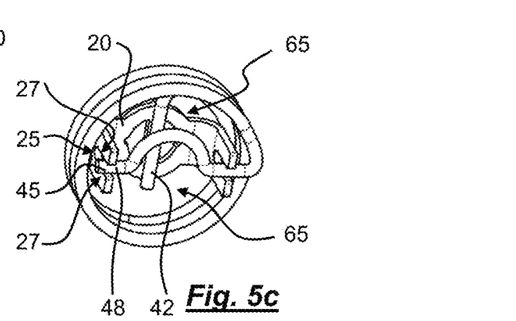

The central section 20 of the sheet metal retainer 2 has a bridge section 20a surrounded on the two opposing sides by apertures 21. The bridge section 20a of the central section 20 crosses the rotary axis A and has a width corresponding to the width of the attachment section 42. The apertures 21 on both sides of the bridge section 20a allow for an engagement section of the drive shaft to for example, to engage through the apertures 21 both of the bridge section 20a and the attachment section 42 of the elastic element for transferring torque between the shaft and the coupling device 1 without causing torsional stress between the elastic elements attachment section 42 and the corresponding section of the retainer 2, to which the attachment section 42 is fixed. In this case, the bridge section 20a. As can be seen in FIG. 5c, the rectilinear rod-like terminal-end of the coil spring 41 forming the attachment section 42 is aligned in parallel with the bridge section 20a extending radially in relation to the rotary axis A.

The sheet metal part has a thickness similar to the width of the threat of the coil spring 41. The width of the folded sections 23a of the sheet metal retainer 2 is no more than 10 times as wide, preferably no more than 5 times as wide as the width of the coupling rod 45 in the circumferential direction surrounding the axis of rotation A, void spaces 65 are present between the opposite folded section 23a.

Figure 6A:
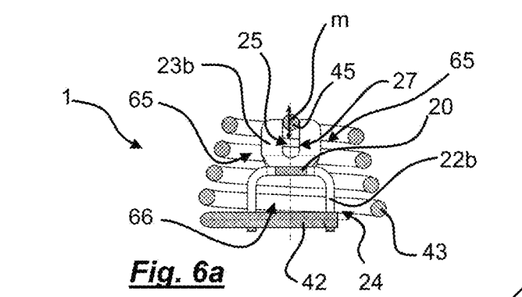
FIGS. 6a-6b show a coupling device according to one or more aspects of the disclosure.

FIG. 6a shows a sectional view of a further embodiment of a coupling device 1. The coupling device 1 of FIG. 6a is shown in different views in FIG. 6b and assembly steps for the coupling device 1 of FIG. 6a are shown in FIGS. 7b through 7e.

The recess 24 of the retainer 2 shown in FIG. 6a is angularly surrounded by the sheet metal body so that the attachment section 42 can come against opposing two opposing limit stops in the direction of the rotary axis. The upper and/or lower limit stop may aid in the assembly, in particular for the torque-proof fixing, of the attachment section 42 to the retainer 2.

The elastic element 4 in the coupling device 1 of FIG. 6a is realized as a conical coil spring 43. The coil spring 43 of FIG. 6a is tapered from the terminal end realizing a rod-shaped rectilinear terminal end 48 realizing the attachment section 42 towards a rod-like rectilinear terminal end 48 realizing the coupling rod 45. In regard to the elastic element 4, reference is therefore made to description regarding to the embodiment shown in FIG. 4a.

The retainer 2 of the embodiment shown in FIG. 6a is realized as a sheet-metal part having two folds 23b bent in a first, upwards direction and provided with slots 25 for receiving the coupling rod. The sheet-metal part realizing the retainer 2 further comprises two seams 22b bent towards a second, downwards direction (opposite to the first direction) in which recesses 24 are provided for receiving the attachment section 42 of the elastic element. The skilled person may contemplate that the sheet-metal-part realized in the retainer 2 might be shaped in a generally cross-like shape prior to bending, wherein two diametrically opposite arms of the cross are bent in the first direction and wherein the two remaining diametrically opposite arms are bent towards a second direction. The retainer 2 has central section 20 from which the folds 23b extend upward and from which the seams 22b extend downwards.

Figure 7A:
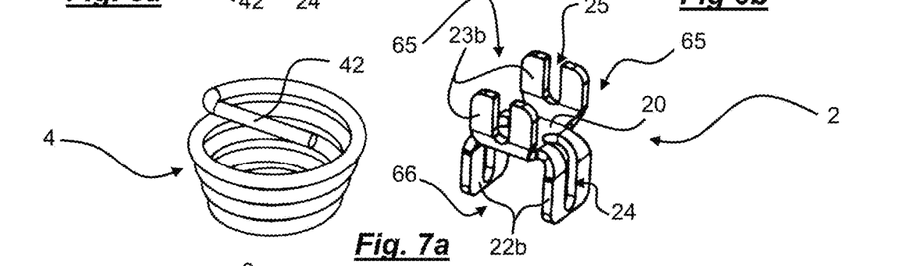
FIGS. 7a-7f show a sequence of stages of assembly of the coupling device of FIGS. 6a-6b according to one or more aspects of the disclosure.
Figures 7B, 7C:
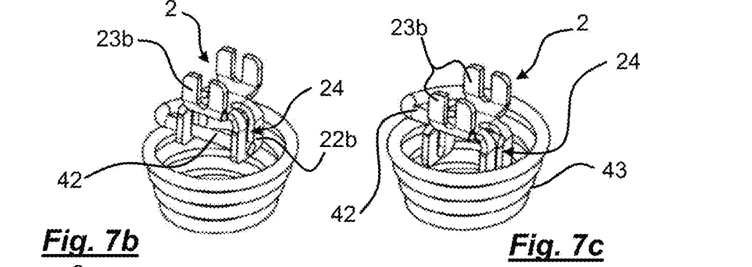

The retainer is shown by itself next to the conical coil spring 43 in FIG. 7a. It may be preferred that the diametrically opposite folds 23b are shaped mirror-symmetrically in relation to one another, likewise or alternatively, the diametrically opposite seams 22b of the retainer 2 may be shaped mirror-symmetrically in relation to one another. The symmetry of the retainer's 2 folds 23b and/or seams 22b may be advantageous reduce unbalance.

The folds 23b are each provided with a slot 25 for receiving the coupling rod 45. In FIG. 6a, the slots 25 are U-shaped and open in the direction of the rotary axis A so as to allow the coupling rod 45 to be easily inserted into the retainer. The folds 23b form edges 27 distanced apart from another corresponding to the width of the coupling rod 45. The edges 27 of the slot serve as a guide the coupling rod 45 in a purely translational manner in relation to the retainers' 2 sheet metal body. Thus, if torque is exerted onto the coupling rod 45 for example from a corresponding coupling section of the drive shaft 31 or driven shaft 51, the torque may be transferred directly without any play from the coupling rod 45 to the retainer 2.

FIG. 7a shows the retainer 2 next to the elastic element 4 in a pre-assembly state. As a first assembly step, according to FIG. 7b, the rod-shape attachment section 42 of the coil spring 43 may be inserted into the recesses 24 of the seams 22b. In the embodiment shown in FIGS. 6a through 7e, the recess 24 for receiving the attachment section 42 provides clearance for the attachment section 42 to move in the direction of the rotary axis A during assembling. The recess 24 may also be dimensioned to include play in the circumferential direction in regard to the axis of rotation of the retainer 2 during assembly. In the direction of the axis a of the retainer 2, the attachment section 42 can be moved for several times its width, preferably its diameter, such as two or three times its width. Between the assembly states shown in FIGS. 7b and 7c, the attachment section 42 has moved within the recess 24 in the direction of the rotary action of the retainer A2, thereby sliding the seams 22b into the space surrounded by the spring 43.

Figures 7D, 7E:
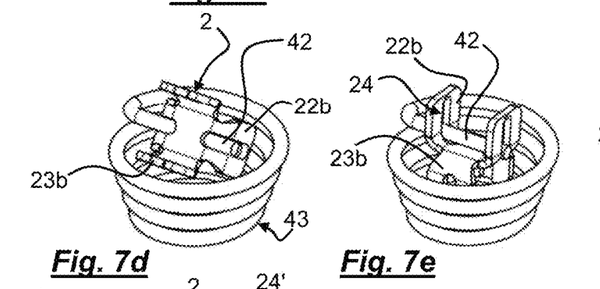

FIG. 7d illustrates the rotation of the retainer 2 around the attachment section 42 within the coil spring 43. FIG. 7e shows the retainer 2 once it has been revolved approximately 100° from the position shown in FIG. 7c in regard to the attachment section 42. Between the states shown in FIGS. 7c and 7e, the attachment section 42 remains within the recess 24 in the seams 22b. While the folds 23b which had initially in FIGS. 7b and 7c pointed outwards from the coil spring 43 and away from the coupling rod, FIG. 7e shows the folds 23b directed towards the coupling rod 45. As shown in FIG. 3b, a coupling rod 45 may be received within the slots 25.

Figure 6B:
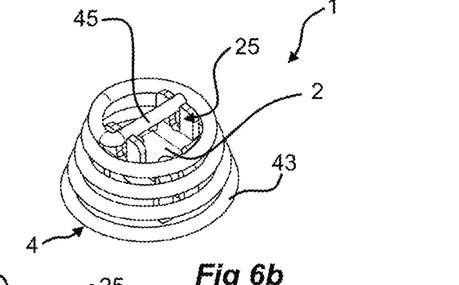
Figure 7F:
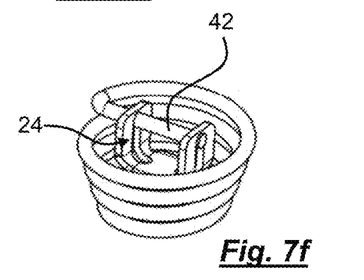

The retainer 2 is moved in the direction of its rotary axis A2, to reach the final assembly position as shown in FIG. 7f. The retainer 2 is moved in relation to the attachment section 42 so that the retainer 2 slides even further into the interior of the coil spring 43. Once the coupling rod 45 is received within the slots 25, as indicated in FIG. 6b, the attachment section 42 is then firmly attached to the retainer 2, for example by welding or soldering the attachment section 42 to the seams 22b or by overmolding the seams 22b, or by some other means, to non-rotatably fix of the attachment section 42 in relation to the retainer 2.

The retainer 2, shown in FIG. 6a through 7f, as can easily be gathered for example from FIG. 6a, can be created with little material leaving large void spaces 65, 66 in circumferential direction between the folds 23b and between the seams 22b. The void space 65, 66 between circumferentially adjacent folds 23b or between circumferentially adjacent seams 22b may be have a circumferential extension at least as long or larger than one respective adjacent fold 23b or seam. In one or more aspects, at least 50%, at least 60% or at least 75% of the circumferential extension of the retainer 2 in a plane perpendicular to the rotational axis A is realized by one or more void space 65, 66 between adjacent folds 23b or seams 22b. The retainer 2 and the spring 43 attached thereto, thereby form a very light weight coupling device 1 which can easily be moved precisely by a drive actuator 3 and which acts as a highly efficient thermal insulation between a drive shaft 31 and a driven shaft 51.

Figure 8A:
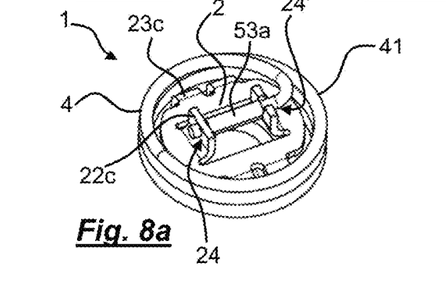
FIG. 8a shows a coupling device with an adapter according to one or more aspects of the disclosure.

A different embodiment of a coupling device is shown in FIG. 8a. The coupling device 1 comprises a circular-cylindrical coil spring 41 attached to a sheet-metal retainer 2 comprising folds 23c extending in a first direction parallel to the rotational axis A of the coupling device 1 and seams 22c extending in a second opposite direction. The retainer shown in FIG. 8a differs from the one previously described relation to FIGS. 6a through 7f in that the seams 22c are shorter and the recesses 24, provided therein are formed like those of the embodiment shown in FIG. 2a.

Figure 8B:
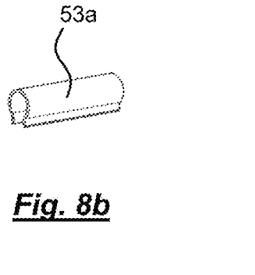
FIG. 8b shows the adapter of FIG. 8a according to one or more aspects of the disclosure.
Figure 8C:
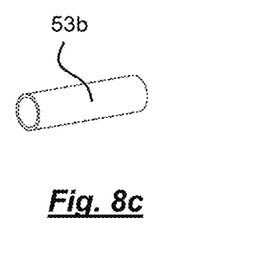
FIG. 8c shows an alternative adapter according to one or more aspects of the disclosure.

Notably, FIG. 8a shows a U-shaped bushing 53a surrounding the attachment section 42 to act as an adapter between the coupling device 1 and a driven shaft or drive shaft engagement section (not shown in further detail). An exemplary embodiment of a U-shaped bushing is shown in FIG. 8b and a cylindrical bushing 53b is shown in FIG. 8c.

Figure 9A:
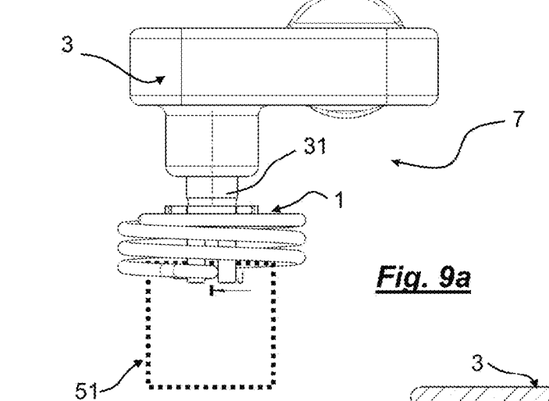
FIGS. 9a, 9b show a valve device with a coupling device of FIG. 5a according to one or more aspects of the disclosure.
Figure 9B:
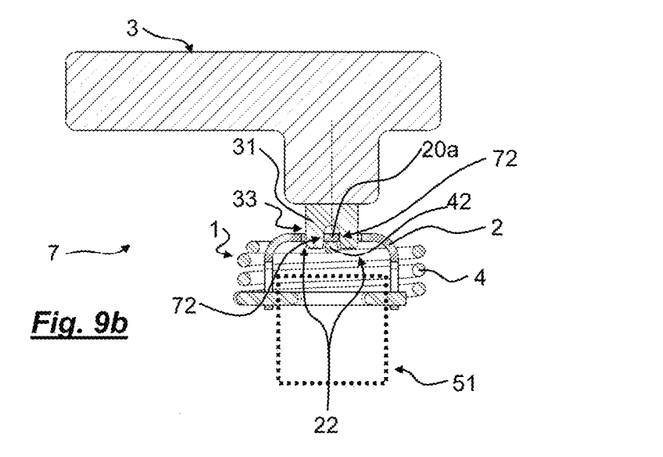

The valve assembly 7 shown in FIGS. 9a and 9b, shows the engagement section 33 engaging two radially opposite contact lines 72 of the coupling device 1. FIG. 9a. shows a side view of the assembly 7 and FIG. 9b a sectional view in accordance with line J-J of FIG. 9a. The driven shaft 51 is indicated schematically. The engagement section 33 of the driving shaft 31 extends into the coupling device 1 through to apertures 22 of the retainer 2. The engagement section 33 firmly grasps the edges of a bridge section 20a of the retainer 2. The engagement section 33 does not directly contact the attachment section 42 or any other part of the elastic element 4. However, the engagement section 33 engages the retainer 2 at its section thereof attached to the attachment section 42.

Figure 10:
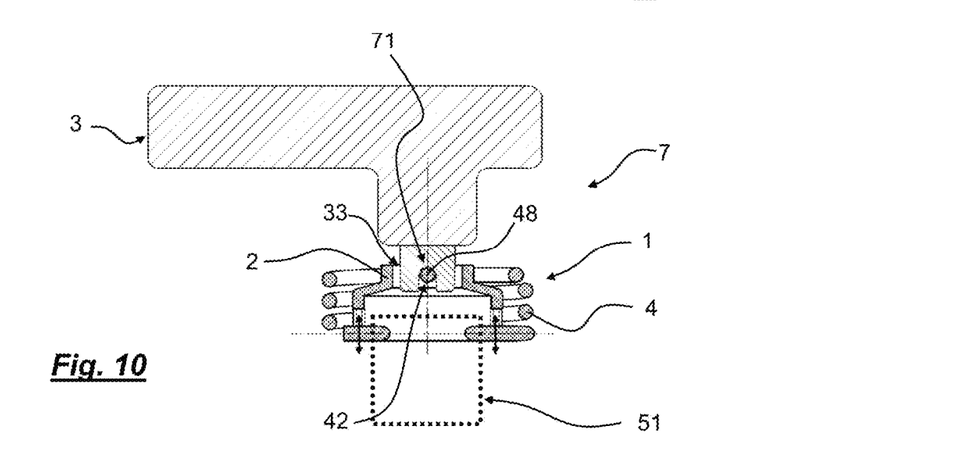
FIG. 10 shows a schematic sectional view of a valve assembly with a coupling device as shown in FIG. 2a according to one or more aspects of the disclosure.

The force and/or torque transmission between the coupling device 1 and the actuator 3 of the embodiments shown in FIGS. 9a, 9b and 10 are essentially identical to one another. Although it may be preferred that the attachment section 42 of the elastic element or corresponding portion of the retainer 2 is attached to the driving shaft 31 in an alternative embodiment, the attachment section or corresponding section of the retainer 2 may be attached to the driven shaft 51.

FIG. 10 shows a valve assembly 7 having an electromotor 3 with a drive shaft 31 that has an engagement section 33. The driven shaft 51 is indicated schematically. The attachment section 42 end of the elastic element 4 sits in the engagement portion 33. A single contact line 71 is realized between the attachment section 42 and the drive shaft 31. The coupling device 1 shown in FIG. 10 corresponds to that described in relation to FIG. 2a. Alternatively, another coupling device, such as described in relation to FIG. 4a, 6a or 8a might alternatively be provided. The attachment section 42 of the coupling device 1 is firmly held by the engagement section 33.

When the driving shaft 31 rotates, driven by the actuator 3, it forces the attachment section 42 and thereby the entire coupling device 1 to perform a corresponding rotary motion. The engagement section 33 engages the coupling device 1 in a torque-proof manner.

FIG. 10 shows the engagement section 33 clamping the attachment section rod 48. The engagement may be form-fitting in the rotary direction in relation to the axis A of rotation. Alternatively, a radial clamping force may hold the coupling device 1 to the engagement section 33. Alternatively, or additionally an axial biasing 4 on to the elastic element 4 between the drive shaft 31 and the driven shaft 50 may aid to hold the coupling device 1 in position.

The features disclosed in the above description, the figures and the claims may be significant for the realization of the disclosure in its different embodiments individually as well as in any combination therefore.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 Coupling device
2 Torsionally rigid retainer
3 Actuator
4 Elastic element
5 Exhaust-gas valve
7 Valve system
20 Central section
20a Bridge section
21 Apertures
22b Seams
22c Seams
23a Folds
23b Folds
23c Folds
24 Recess
25 Slot
27 Edges
28 Cylindrical body
29 Cylindrical body
31 Drive shaft
33 Engagement section
41 Coil spring
42 Attachment section
43 Coil spring
45 Coupling rod
47 Arc-section
48 Rectilinear rod sections
51 Driven shaft
53 U-shaped bushing
64 Void space
65 Void space
66 Void space
71 Contact lines
72 Contact lines
81 Narrow section
82 Step section
83 Wide section
A axis

The invention claimed is:

1. A coupling device for connecting a drive shaft of an actuator to a driven shaft of an exhaust-gas valve, the coupling device defining a rotational axis and comprising:
a torsionally rigid retainer comprising a hollow cylindrical body with an axially extending slot, the hollow cylindrical body comprising a staged diameter including at least a narrow section that includes a recess and a wide section wider than the narrow section, the wide section including the axially extending slot;
a coupling rod received in the slot and configured to translationally move relative to the retainer in a direction of the rotational axis, wherein opposite edges of the slot are distanced apart from another by a distance corresponding to an exterior diameter of the coupling rod such that the coupling rod has no rotational play in the corresponding slot; and
an elastic element configured to bias the coupling rod in the direction of the rotational axis and having an attachment section fixed to the retainer, wherein the retainer and the coupling rod are non-rotatably connected.

2. The coupling device according to claim 1, wherein the edges are opposite one another in a circumferential direction relative to the rotational axis of the coupling device, the edges extending parallel to the rotational axis of the coupling device and being configured to guide the coupling rod translationally and transfer torque from the coupling rod to the retainer, the elastic member comprising a conical coil spring including a narrow end fixed to the coupling rod and/or a wide end fixed to the attachment section.

3. The coupling device according to claim 1, wherein the elastic member comprises a conical coil spring including a narrow end fixed to the coupling rod and/or a wide end fixed to the attachment section.

4. The coupling device according to claim 1, wherein the elastic element and the coupling rod are formed in a one-piece manner as a thread of constant diameter.

5. The coupling device according to claim 1, wherein the retainer comprises at least one void space extending along the direction of the rotational axis between cylindrical body sections of the hollow cylindrical body or between adjacent folds and/or seams.

6. A valve system comprising:
an actuator with a drive shaft;
an exhaust-gas valve with a driven shaft; and
the coupling device according to claim 1.

7. The valve system according to claim 6, further comprising an adapter configured to form-fittingly engage the drive shaft or driven shaft, wherein the adapter surrounds the attachment section, and wherein the attachment section or a section of the retainer fixed to the attachment section is connected with the drive shaft.

8. The valve system according to claim 6, further comprising an adapter configured to form-fittingly engage the drive shaft or driven shaft, wherein the adapter surrounds the attachment section.

9. The valve system according to claim 6, wherein:
the drive shaft and/or the driven shaft realizes one or two respective contact lines with the coupling rod, the attachment section or the section of the retainer fixed to the attachment section; and
torque is exclusively transferred from the drive shaft to the driven shaft through the retainer such that the elastic element remains free from torque, the elastic element being tensioned or free of tension in the direction of the rotational axis.

10. The valve system according to claim 6, wherein torque is exclusively transferred from the drive shaft to the driven shaft through the retainer such that the elastic element remains free from torque, the elastic element being tensioned or free of tension in the direction of the rotational axis.

11. The valve system according to claim 6, wherein the coupler coupling device is configured to connect the driven shaft to the drive shaft with axial clearance and without rotational clearance.

12. A method for assembling a coupling device, comprising:
a) providing a retainer including a hollow cylindrical body with an axially extending slot and a recess configured to hold an attachment section, wherein the hollow cylindrical body comprises a staged diameter including at least a narrow section that includes the recess and a wide section wider than the narrow section that includes the axially extending slot;
b) providing a coil spring including a coupling rod and the attachment section;
c) fitting the coupling rod into the slot of the retainer such that the coupling rod is translationally movable relative to the retainer in a direction of a rotational axis, wherein opposite edges of the slot are distanced apart from another by a distance corresponding to an exterior diameter of the coupling rod such that the coupling rod has no rotational play in the slot; and
d) fitting the attachment section into the recess of the retainer.

13. The method according to claim 12, further comprising rotating the retainer within the coils spring between step c) and step d).

14. The method according to claim 13, wherein the retainer is moved translationally along its axis along the attachment section or along the coupling rod at least once before, during and/or after the rotation.

15. A coupling device for connecting a drive shaft of an actuator to a driven shaft of an exhaust-gas valve, the coupling device defining a rotational axis and comprising:
a torsionally rigid retainer comprising a central section, two folds bent towards a first direction relative to the central section, and an axially extending slot formed by the two folds;
a coupling rod received in the slot and configured to translationally move relative to the retainer in a direction of the rotational axis; and
an elastic element configured to bias the coupling rod in the direction of the rotational axis and having an attachment section fixed to the retainer, wherein the retainer and the coupling rod are non-rotatably connected, wherein the retainer further comprises:
first and second seams bent towards a second direction relative to the central section and opposite the first direction, the first and second seams forming at least one recess configured to hold the attachment section; or
a sheet metal part including the central section and two folds and/or two seams, the two folds and/or the two seams extending from the central section.

16. The coupling device according to claim 15, wherein the retainer further comprises a central plate section between the folds, the central plate section being connected to the attachment section.

* * * * *